United States Patent
Qiao et al.

(10) Patent No.: US 12,538,326 B2
(45) Date of Patent: Jan. 27, 2026

(54) DOWNLINK TRANSMISSION METHOD AND DEVICE, AND STORAGE MEDIUM

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 390 days.

(21) Appl. No.: 18/025,016

(22) PCT Filed: Sep. 9, 2020

(86) PCT No.: PCT/CN2020/114272
§ 371 (c)(1),
(2) Date: Mar. 7, 2023

(87) PCT Pub. No.: WO2022/051948
PCT Pub. Date: Mar. 17, 2022

(65) Prior Publication Data
US 2023/0328754 A1      Oct. 12, 2023

(51) Int. Cl.
*H04W 72/232* (2023.01)
*H04W 72/1273* (2023.01)
*H04W 76/20* (2018.01)

(52) U.S. Cl.
CPC ..... *H04W 72/232* (2023.01); *H04W 72/1273* (2013.01); *H04W 76/20* (2018.02)

(58) Field of Classification Search
CPC ............ H04W 72/232; H04W 76/20; H04W 72/1273
See application file for complete search history.

(56) References Cited

U.S. PATENT DOCUMENTS

| | | | |
|---|---|---|---|
| 2017/0264399 A1 | 9/2017 | Li et al. | |
| 2020/0162208 A1* | 5/2020 | Moon | H04W 72/23 |
| 2020/0204312 A1* | 6/2020 | Xu | H04L 27/26025 |
| 2021/0307051 A1* | 9/2021 | Chatterjee | H04W 72/0453 |
| 2021/0360667 A1* | 11/2021 | Moon | H04L 5/0035 |
| 2022/0086896 A1* | 3/2022 | Takahashi | H04W 72/1268 |

(Continued)

FOREIGN PATENT DOCUMENTS

| | | |
|---|---|---|
| EP | 2939464 B1 | 3/2018 |
| WO | WO 2019157685 A1 | 8/2019 |
| WO | WO 2020024080 A1 | 2/2020 |

OTHER PUBLICATIONS

PCT/CN2020/114272, English translation of Search Report dated May 27, 2021, 3 pages.

(Continued)

*Primary Examiner* — Jael M Ulysse
(74) *Attorney, Agent, or Firm* — Cozen O'Connor

(57) ABSTRACT

A terminal in a 5G new radio (NR) network that meets the requirements of mid-range Internet of Things (IoT) devices is referred to as a reduced capability user equipment (UE) or simply called Redcap UE. A downlink transmission method for use with a Redcap UE includes: determining a first parameter configured to indicate the number of repeated transmissions of a physical downlink control channel of a first type of terminal; and performing downlink transmissions based on the first parameter.

16 Claims, 6 Drawing Sheets

(56) References Cited

U.S. PATENT DOCUMENTS

| | | | |
|---|---|---|---|
| 2022/0110138 A1* | 4/2022 | Miao | H04L 5/0053 |
| 2023/0073095 A1* | 3/2023 | Kim | H04W 72/1273 |
| 2023/0091216 A1* | 3/2023 | Yamamoto | H04L 1/08 |
| | | | 370/329 |
| 2023/0156736 A1* | 5/2023 | He | H04W 72/232 |
| | | | 370/329 |
| 2023/0309111 A1* | 9/2023 | Matsumura | H04W 72/1263 |
| 2023/0328728 A1* | 10/2023 | Wang | H04W 76/20 |
| 2024/0031067 A1* | 1/2024 | Gao | H04L 5/0044 |
| 2024/0314808 A1* | 9/2024 | Seok | H04L 1/0072 |

OTHER PUBLICATIONS

Huawei et al. "DCI for NB-IoT" 3GPP TSG RAN WG1 NB-IoT Ad-Hoc Meeting #2, R1-161803, Mar. 2016, 7 pages.

LG Electronics "PDSCH/PUSCH transmission for MTC coverage enhancement" 3GPP TSG RAN WG1 Meeting #75, R1-135462, Nov. 2013, 5 pages.

European Patent Application No. 20952736.5 Search and Opinion dated Mar. 14, 2024, 13 pages.

Sony, "MTC Operation with a Narrowband PDCCH" 3GPP TSG-RAN WG1 Meeting #80, R1-150428, Feb. 2015, 16 pages.

Indian Patent Application No. 202347025897, Office Action Dec. 5, 2023, 6 pages.

\* cited by examiner

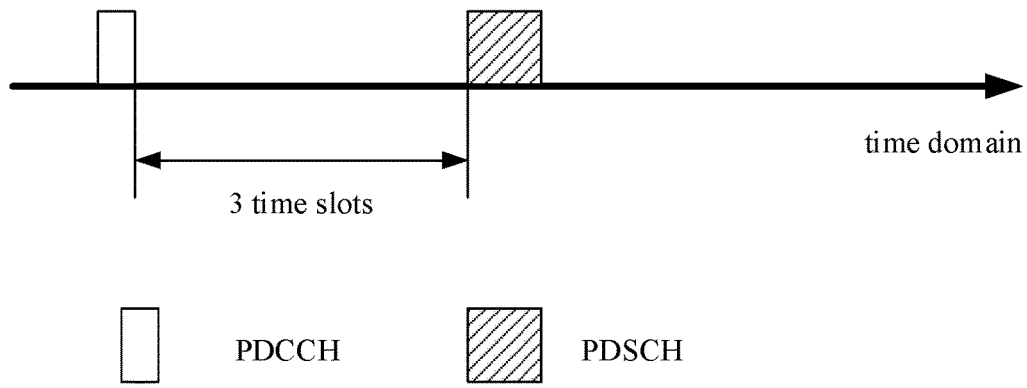

FIG. 4 determining a first parameter, a second parameter and a third parameter, the first parameter being configured to indicate the number of repeated transmissions of a PDCCH of a first type of terminal, the second parameter being configured to indicate the number of repeated transmissions of a PDSCH of the first type of terminal, and the third parameter being configured to indicate a time slot offset of a first time domain position relative to a second time domain position — S31 performing joint repeated transmissions of the PDCCH and the PDSCH based on the first parameter, the second parameter and the third parameter — S32

FIG. 5

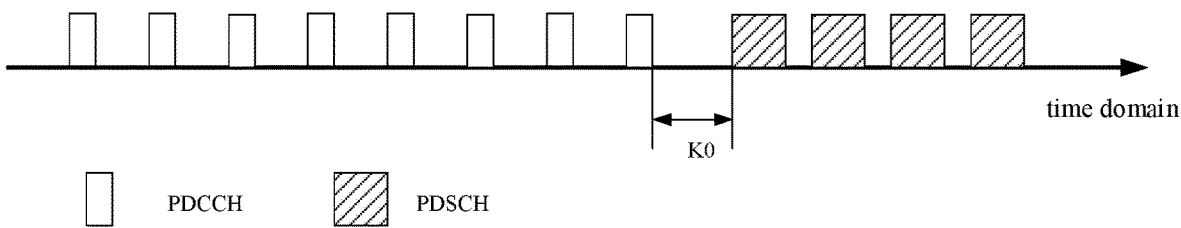

FIG. 6

DOWNLINK TRANSMISSION METHOD AND DEVICE, AND STORAGE MEDIUM

CROSS-REFERENCE TO RELATED APPLICATIONS

This application is a U.S. National Stage Application of International Application No. PCT/CN2020/114272, filed Sep. 9, 2020, the entire contents of which are incorporated herein by reference.

TECHNICAL FIELD

The present disclosure relates to the communication technology field, and more particularly to a downlink transmission method and device, and a storage medium.

BACKGROUND

With the continuous development of Internet of Things (IoT) services, services like video monitoring, smart home, a wearable device, and industrial sensor monitoring, are becoming more popular and widely used. These services generally require a data rate of several tens to 100 Mbps and put forward relatively high requirements for delay. Therefore, machine type communication (MTC) and narrow band internet of thing (NB-IoT) technologies in the related art have difficulty meeting the requirements. For this, it is proposed to design a new type of terminal in a 5G new radio (NR) network to meet the requirements of these mid-range IoT devices. In the current 3GPP standardization, this new type of terminal is referred to as a reduced capability user equipment (UE) or simply called Redcap UE.

Generally, the Redcap UE meets the following requirements:
low cost, low complexity,
a certain degree of coverage enhancement, and
power saving.

Since the current NR system is designed for high-end terminals with high rate and low delay, the current design cannot meet the above requirements of the Redcap UE. Therefore, it is necessary to modify the current NR system to meet the requirements of the Redcap UE. For example, in order to meet the requirements of low cost and low complexity, the number of receiving antennas of the Redcap UE can be limited. However, reducing the number of the receiving antennas of the Redcap UE will cause coverage loss and affect the communication performance.

SUMMARY

In order to overcome the problems existing in the related art, the present disclosure provides a downlink transmission method and device, and a storage medium.

According to a first aspect of embodiments of the present disclosure, there is provided a downlink transmission method, which is applied to a terminal. The downlink transmission method includes: determining a first parameter configured to indicate the number of repeated transmissions of a physical downlink control channel of a first type of terminal; and performing downlink transmissions based on the first parameter.

According to a second aspect of embodiments of the present disclosure, there is provided a downlink transmission method, which is applied to a network device and includes: determining a first parameter configured to indicate the number of repeated transmissions of a physical downlink control channel of a first type of terminal; and sending the first parameter.

According to a third aspect of embodiments of the present disclosure, there is provided a downlink transmission device, which includes: a processor; and a memory for storing instructions executable by the processor. The processor is configured to execute the downlink transmission method as described in the first aspect or in any embodiment of the first aspect.

According to a fourth aspect of embodiments of the present disclosure, there is provided a downlink transmission device, includes: a processor; and a memory for storing instructions executable by the processor. The processor is configured to execute the downlink transmission method as described in the second aspect or in any embodiment of the second aspect.

According to a fifth aspect of embodiments of the present disclosure, there is provided a non-transitory computer-readable storage medium having stored therein instructions that, when executed by a processor of a mobile terminal, enable the mobile terminal to perform the downlink transmission method as described in the first aspect or in any embodiment of the first aspect.

According to a sixth aspect of embodiments of the present disclosure, there is provided a non-transitory computer-readable storage medium having stored therein instructions that, when executed by a processor of a network device, enable the network device to perform the downlink transmission method as described in the second aspect or in any embodiment of the second aspect.

It is to be understood that both the foregoing general description and the following detailed description are illustrative and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 4 is a schematic diagram showing a pattern for joint transmission of a physical downlink control channel (PDCCH) and a physical downlink shared channel (PDSCH) according to an illustrative embodiment.

FIG. 5 is a flowchart showing a downlink transmission method according to an illustrative embodiment.

FIG. 6 is a schematic diagram showing a pattern for joint repeated transmissions of PDCCH and PDSCH according to an illustrative embodiment.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with some aspects of the present disclosure as recited in the appended claims.

Figure 1:
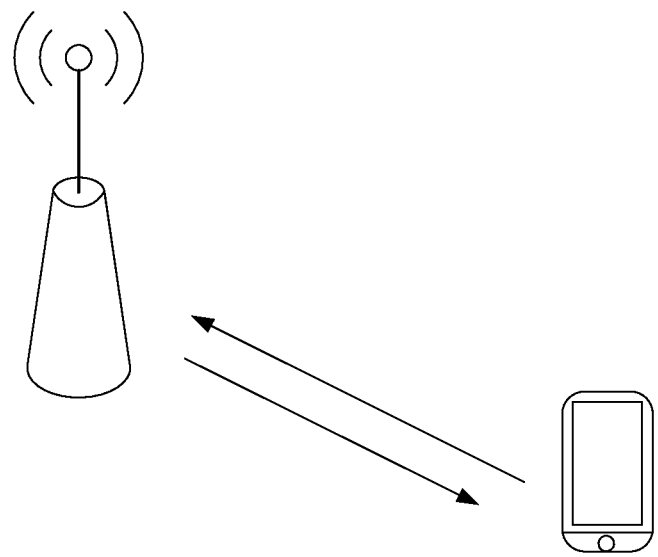
FIG. 1 is an architectural diagram showing a wireless communication system according to an illustrative embodiment.

A downlink transmission method provided in embodiments of the present disclosure may be applied to a wireless communication system shown in FIG. 1. Referring to FIG. 1, the wireless communication system includes a terminal and a network device. Information is sent and received between the terminal and the network device through wireless resources.

It may be understood that the wireless communication system shown in FIG. 1 is merely for the purpose of illustration, and the wireless communication system may further include other network devices, such as a core network device, a wireless relay device, and a wireless backhaul device, etc., which are not shown in FIG. 1. Embodiments of the present disclosure do not limit the number of the network devices and the number of the terminals included in the wireless communication system.

It may be further understood that the wireless communication system described in embodiments of the present disclosure is a network providing a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. The network may be classified into a 2nd generation (2G) network, a 3G network, a 4G network or a future evolution network, such as a 5G network (also referred to as a new radio, NR) according to the capacity, rate, delay and other factors of different networks. For ease of description, the present disclosure will sometimes refer to a wireless communication network simply as a network.

Further, the network device involved in the present disclosure may also be referred to as a radio access network device. The radio access network device may be a base station, an evolved base station (eNodeB, eNB), a home base station, an access point (AP) in a wireless fidelity (WIFI) system, a wireless relay node, a wireless backhaul node, a transmission point (TP), or a transmission and reception point (TRP), etc., or may also be a gNB in a NR system, or may also be a component or a device of a base station, etc.

In addition, when the wireless communication system is a vehicle to everything (V2X) communication system, the network device may also be a vehicle-mounted device. It is to be understood that embodiments of the present disclosure do not limit the technology and the device form adopted by the network device.

Further, the terminal involved in the present disclosure, which may also be referred to as a terminal device, a user equipment (UE), a mobile station (MS), a mobile terminal (MT), etc., is a device that provides voice and/or data connectivity to a user. For example, the terminal may be a device having a wireless connection function, such as a handheld device, a vehicle-mounted device or the like. At present, some examples of the terminal are a mobile phone, a pocket personal computer (PPC), a palmtop computer, a personal digital assistant (PDA), a notebook computer, a tablet computer, a wearable device, or a vehicle-mounted device, etc. In addition, the terminal device may also be a vehicle-mounted device when the wireless communication system is a vehicle to everything (V2X) communication system. It is to be understood that embodiments of the present disclosure do not limit the technology and device form adopted by the terminal.

The terminal involved in embodiments of the present disclosure may be a Redcap UE. In order to meet the requirements of low cost and low complexity, it is possible to limit a bandwidth of the Redcap UE, for example, to 10 MHz or 20 MHz, or limit the number of receiving antennas of the Redcap UE. For power saving, a possible optimization direction is to reduce the processing complexity of the user equipment. For example, only the physical downlink control channel (PDCCH) channel is received in the same time slot, and the terminal enters a non-awake state at other symbol times of the same time slot. For a certain degree of coverage enhancement, possible methods include performing multiple repeated transmissions for each channel, increasing an aggregation level, and reducing a code rate. In some embodiments, the non-awake state may be a micro-sleep state or any other non-awake state.

In the existing NR system, for different frequency bands, a common terminal equipment may support 4 or 2 receiving antennas, while for the Redcap UE, in order to reduce the complexity and cost, the number of the receiving antennas may be reduced to 2 or 1 for different frequency bands. For the transmission of the Redcap UE, if the existing PDCCH & PDSCH transmission mechanism is used, the coverage of the network will inevitably be reduced, so that the transmission reliability of the control signaling and data of the Redcap UE far away from the base station cannot be guaranteed. In the existing NR system, for a PDCCH channel of a single transmission, if the number of receiving antennas of the terminal equipment is reduced from 4 to 2, it will cause a coverage loss of about 2.5 to 4 dB; if the number of receiving antennas of the terminal equipment is reduced from 2 to 1, it will cause a coverage loss of about 3 to 5 dB; and if the number of receiving antennas of the user equipment is reduced from 4 to 1, it may cause a coverage loss as high as 6 to 9 dB.

In order to remedy the coverage loss caused by the reduction of the number of receiving antennas of the Redcap UE, the present disclosure provides a downlink transmission method, in which the transmission of the PDCCH channel can be enhanced by means of multiple repeated transmissions.

According to a first aspect of embodiments of the present disclosure, there is provided a downlink transmission method, which is applied to a terminal. The downlink transmission method includes: determining a first parameter configured to indicate the number of repeated transmissions of a physical downlink control channel of a first type of terminal; and performing downlink transmissions based on the first parameter.

In an embodiment, the downlink transmission method further includes: determining a second parameter configured to indicate the number of repeated transmissions of a physical downlink shared channel of the first type of terminal.

In an embodiment, the downlink transmission method further includes: determining a third parameter configured to indicate a time slot offset of a first time domain position relative to a second time domain position. The first time domain position is a time domain position of a transmission of the physical downlink shared channel, and the second time domain position is a time domain position of a transmission of the physical downlink control channel.

In an embodiment, the first time domain position is a time domain position of a first transmission of the physical downlink shared channel, and the second time domain position is a time domain position of a last transmission of the physical downlink control channel.

In an embodiment, performing downlink transmissions based on the first parameter includes: determining a time domain position of a first transmission of the physical downlink control channel, receiving the physical downlink control channel according to the number of repeated transmissions of the physical downlink control channel, starting from the time domain position of the first transmission of the physical downlink control channel, and receiving the physical downlink shared channel according to the number of repeated transmissions of the physical downlink shared channel at the first time domain position after the second time domain position.

In an embodiment, receiving the physical downlink control channel according to the number of repeated transmissions of the physical downlink control channel includes: entering a non-awake state in response to receiving the physical downlink control channel at a time domain position of the physical downlink control channel, and maintaining the non-awake state until a next time domain position of the physical downlink control channel, and entering an awake state at the next time domain position of the physical downlink control channel and receiving the physical downlink control channel.

In an embodiment, the non-awake state is a micro-sleep state.

In an embodiment, performing downlink transmissions based on the first parameter further includes: decoding a received physical downlink control channel at a time domain position of an even-numbered transmission; entering a sleep state in response to successful decoding of the physical downlink control channel, maintaining the sleep state until the first time domain position, entering an awake state at the first time domain position, and receiving the physical downlink shared channel.

In an embodiment, performing downlink transmissions based on the first parameter further includes: decoding a received physical downlink control channel at a time domain position of an even-numbered transmission; and caching the physical downlink control channel in response to unsuccessful decoding of the physical downlink control channel.

In an embodiment, receiving the physical downlink shared channel includes: decoding a received physical downlink shared channel at a position of each transmission of the physical downlink shared channel; and entering a sleep state in response to successful decoding of the physical downlink shared channel.

In an embodiment, receiving the physical downlink shared channel includes: decoding a received physical downlink shared channel at a position of each transmission of the physical downlink shared channel; and caching the physical downlink shared channel in response to unsuccessful decoding of the physical downlink shared channel.

In an embodiment, the first time domain position is a time domain position of a first transmission of the physical downlink shared channel, the second time domain position is a time domain position of an $N^{th}$ transmission of the physical downlink control channel, and the $N^{th}$ transmission of the physical downlink control channel is any transmission of the physical downlink control channel other than a last transmission of the physical downlink control channel.

In an embodiment, performing downlink transmissions based on the first parameter includes: determining a time domain position of a first transmission of the physical downlink control channel; receiving and caching the physical downlink control channel according to the number of repeated transmissions of the physical downlink control channel, starting from the time domain position of the first transmission of the physical downlink control channel; and receiving and caching the physical downlink shared channel according to the number of repeated transmissions of the physical downlink shared channel, starting from the time domain position of the $N^{th}$ transmission of the physical downlink control channel.

In an embodiment, receiving the physical downlink control channel according to the number of repeated transmissions of the physical downlink control channel and receiving the physical downlink shared channel according to the number of repeated transmissions of the physical downlink shared channel includes: decoding a received physical downlink control channel at a time domain position of an even-numbered transmission; determining a time domain position of a transmission of the physical downlink shared channel and decoding the physical downlink shared channel, in response to successful decoding of the physical downlink control channel.

In an embodiment, receiving the physical downlink control channel according to the number of repeated transmissions of the physical downlink control channel and receiving the physical downlink shared channel according to the number of repeated transmissions of the physical downlink shared channel includes: decoding a received physical downlink control channel at a time domain position of an even-numbered transmission; and receiving and caching the physical downlink control channel and the physical downlink shared channel at a next time domain position of the physical downlink control channel, in response to unsuccessful decoding of the physical downlink control channel.

In an embodiment, decoding the physical downlink shared channel includes: in response to determining that there is a physical downlink shared channel cached at the time domain position of the transmission of the physical downlink shared channel determined, decoding the physical downlink shared channel cached.

In an embodiment, decoding the physical downlink shared channel includes: in response to determining that there is no physical downlink shared channel cached at the time domain position of the transmission of the physical downlink shared channel determined, entering a sleep state and maintaining the sleep state until a next time domain position of the physical downlink shared channel, entering an awake state at the next time domain position of the physical downlink shared channel, and receiving and decoding the physical downlink shared channel.

In an embodiment, decoding the physical downlink shared channel cached includes: entering a sleep state until time domain transmissions of the physical downlink shared channel and the physical downlink control channel end, in response to successful decoding of the physical downlink shared channel.

In an embodiment, decoding the physical downlink shared channel cached includes: receiving and caching the physical downlink shared channel at a next time domain position of the physical downlink shared channel, and stopping receiving the physical downlink control channel, in response to unsuccessful decoding of the physical downlink shared channel.

In an embodiment, the time domain position of the $N^{th}$ transmission of the physical downlink control channel is a time domain position of a first transmission of the physical downlink control channel.

In an embodiment, the time domain position of the $N^{th}$ transmission of the physical downlink control channel is a time domain position of a transmission other than a first transmission and the last transmission of the physical downlink control channel.

In an embodiment, the downlink transmission method further includes: determining a fourth parameter configured to indicate the time domain position of the $N^{th}$ transmission of the physical downlink control channel.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information; and the time domain position of the $N^{th}$ transmission of the physical downlink control channel is determined based on the number of repeated transmissions of the physical downlink control channel and an index of the time domain position of the $N^{th}$ transmission of the physical downlink control channel.

In an embodiment, the downlink control information includes a first information field, and the first information field is configured to indicate the index of the time domain position of the $N^{th}$ transmission of the physical downlink control channel.

According to a second aspect of embodiments of the present disclosure, there is provided a downlink transmission method, which is applied to a network device and includes: determining a first parameter configured to indicate the number of repeated transmissions of a physical downlink control channel of a first type of terminal; and sending the first parameter.

In an embodiment, the downlink transmission method further includes: determining a second parameter configured to indicate the number of repeated transmissions of a physical downlink shared channel of the first type of terminal; and sending the second parameter.

In an embodiment, the downlink transmission method further includes: determining a third parameter configured to indicate a time slot offset of a first time domain position relative to a second time domain position. The first time domain position is a time domain position of a transmission of the physical downlink shared channel, and the second time domain position is a time domain position of a transmission of the physical downlink control channel.

In an embodiment, the first time domain position is a time domain position of a first transmission of the physical downlink shared channel, and the second time domain position is a time domain position of a last transmission of the physical downlink control channel.

In an embodiment, the first time domain position is a time domain position of a first transmission of the physical downlink shared channel, the second time domain position is a time domain position of an $N^{th}$ transmission of the physical downlink control channel, and the $N^{th}$ transmission of the physical downlink control channel is not a last transmission of the physical downlink control channel.

In an embodiment, the time domain position of the $N^{th}$ transmission of the physical downlink control channel is a time domain position of a first transmission of the physical downlink control channel.

In an embodiment, the time domain position of the $N^{th}$ transmission of the physical downlink control channel is a time domain position of a transmission other than a first transmission and the last transmission of the physical downlink control channel.

In an embodiment, the downlink transmission method further includes: determining a fourth parameter configured to indicate the time domain position of the $N^{th}$ transmission of the physical downlink control channel.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information; and the time domain position of the $N^{th}$ transmission of the physical downlink control channel is determined based on the number of repeated transmissions of the physical downlink control channel and an index of the time domain position of the $N^{th}$ transmission of the physical downlink control channel.

In an embodiment, the downlink control information includes a first information field, and the first information field is configured to indicate the index of the time domain position of the $N^{th}$ transmission of the physical downlink control channel.

According to a third aspect of embodiments of the present disclosure, there is provided a downlink transmission apparatus, which is applied to a terminal. The downlink transmission apparatus includes: a determining unit, configured to determine a first parameter configured to indicate the number of repeated transmissions of a physical downlink control channel of a first type of terminal; and a transmission unit, configured to perform downlink transmissions based on the first parameter.

In an embodiment, the determining unit is further configured to determine a second parameter configured to indicate the number of repeated transmissions of a physical downlink shared channel of the first type of terminal.

In an embodiment, the determining unit is further configured to: determine a third parameter configured to indicate a time slot offset of a first time domain position relative to a second time domain position. The first time domain position is a time domain position of a transmission of the physical downlink shared channel, and the second time domain position is a time domain position of a transmission of the physical downlink control channel.

In an embodiment, the first time domain position is a time domain position of a first transmission of the physical downlink shared channel, and the second time domain position is a time domain position of a last transmission of the physical downlink control channel.

In an embodiment, the transmission unit is configured to perform the downlink transmissions based on the first parameter by: determining a time domain position of a first transmission of the physical downlink control channel, receiving the physical downlink control channel according to the number of repeated transmissions of the physical downlink control channel, starting from the time domain position of the first transmission of the physical downlink control channel, and receiving the physical downlink shared channel according to the number of repeated transmissions of the physical downlink shared channel at the first time domain position after the second time domain position.

In an embodiment, the transmission unit is configured to receive the physical downlink control channel according to the number of repeated transmissions of the physical downlink control channel by: entering a non-awake state in response to receiving the physical downlink control channel at a current time domain position of the physical downlink control channel, and maintaining the non-awake state until a next time domain position of the physical downlink control channel, and entering an awake state at the next time domain position of the physical downlink control channel and receiving the physical downlink control channel.

In an embodiment, the transmission unit is configured to perform the downlink transmissions based on the first parameter by: decoding a received physical downlink control channel at a time domain position of an even-numbered transmission; and entering a sleep state in response to successful decoding of the physical downlink control channel and maintaining the sleep state until the first time domain position, entering an awake state at the first time domain position and receiving the physical downlink shared channel; or caching the physical downlink control channel in response to unsuccessful decoding of the physical downlink control channel.

In an embodiment, the transmission unit is configured to receive the physical downlink shared channel by: decoding a received physical downlink shared channel at a position of each transmission of the physical downlink shared channel; and entering a sleep state in response to successful decoding of the physical downlink shared channel; or caching the physical downlink shared channel in response to unsuccessful decoding of the physical downlink shared channel.

In an embodiment, the first time domain position is a time domain position of a first transmission of the physical downlink shared channel, the second time domain position is a time domain position of an $N^{th}$ transmission of the physical downlink control channel, and the $N^{th}$ transmission of the physical downlink control channel is not a last transmission of the physical downlink control channel.

In an embodiment, the transmission unit is configured to perform the downlink transmissions based on the first parameter r by: determining a time domain position of a first transmission of the physical downlink control channel; receiving and caching the physical downlink control channel according to the number of repeated transmissions of the physical downlink control channel, starting from the time domain position of the first transmission of the physical downlink control channel; and receiving and caching the physical downlink shared channel according to the number of repeated transmissions of the physical downlink shared channel, starting from the time domain position of the $N^{th}$ transmission of the physical downlink control channel.

In an embodiment, the transmission unit is configured to receive the physical downlink control channel according to the number of repeated transmissions of the physical downlink control channel and receive the physical downlink shared channel according to the number of repeated transmissions of the physical downlink shared channel by: decoding a received physical downlink control channel at a time domain position of an even-numbered transmission; and determining a time domain position of a transmission of the physical downlink shared channel and decoding the physical downlink shared channel, in response to successful decoding of the physical downlink control channel; or receiving and caching the physical downlink control channel and the physical downlink shared channel at a next time domain position of the physical downlink control channel, in response to unsuccessful decoding of the physical downlink control channel.

In an embodiment, the transmission unit is configured to decode the physical downlink shared channel by: in response to determining that there is a physical downlink shared channel cached at the time domain position of the transmission of the physical downlink shared channel determined, decoding the physical downlink shared channel cached; or in response to determining that there is no physical downlink shared channel cached at the time domain position of the transmission of the physical downlink shared channel determined, entering a sleep state and maintaining the sleep state until a next time domain position of the physical downlink shared channel, entering an awake state at the next time domain position of the physical downlink shared channel, and receiving and decoding the physical downlink shared channel.

In an embodiment, the transmission unit is configured to decode the physical downlink shared channel cached by: entering a sleep state until time domain transmissions of the physical downlink shared channel and the physical downlink control channel end, in response to successful decoding of the physical downlink shared channel; or receiving and caching the physical downlink shared channel at a next time domain position of the physical downlink shared channel, and stopping receiving the physical downlink control channel, in response to unsuccessful decoding of the physical downlink shared channel.

In an embodiment, the time domain position of the $N^{th}$ transmission of the physical downlink control channel is a time domain position of a first transmission of the physical downlink control channel.

In an embodiment, the time domain position of the $N^{th}$ transmission of the physical downlink control channel is a time domain position of a transmission other than a first transmission and the last transmission of the physical downlink control channel.

In an embodiment, the determining unit is further configured to: determine a fourth parameter configured to indicate the time domain position of the $N^{th}$ transmission of the physical downlink control channel.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information; and the time domain position of the $N^{th}$ transmission of the physical downlink control channel is determined based on the number of repeated transmissions of the physical downlink control channel and an index of the time domain position of the $N^{th}$ transmission of the physical downlink control channel.

In an embodiment, the downlink control information includes a first information field, and the first information field is configured to indicate the index of the time domain position of the $N^{th}$ transmission of the physical downlink control channel.

According to a fourth aspect of embodiments of the present disclosure, there is provided a downlink transmission apparatus, which is applied to a network device. The downlink transmission apparatus includes: a determining unit, configured to determine a first parameter configured to indicate the number of repeated transmissions of a physical downlink control channel of a first type of terminal; and a sending unit, configured to send the first parameter.

In an embodiment, the determining unit is further configured to determine a second parameter configured to indicate the number of repeated transmissions of a physical downlink shared channel of the first type of terminal; and the sending unit is further configured to send the second parameter.

In an embodiment, the determining unit is further configured to determine a third parameter configured to indicate a time slot offset of a first time domain position relative to a second time domain position, the first time domain position is a time domain position of a transmission of the physical downlink shared channel, and the second time domain position is a time domain position of a transmission of the physical downlink control channel.

In an embodiment, the first time domain position is a time domain position of a first transmission of the physical downlink shared channel, and the second time domain position is a time domain position of a last transmission of the physical downlink control channel.

In an embodiment, the first time domain position is a time domain position of a first transmission of the physical downlink shared channel, the second time domain position is a time domain position of an $N^{th}$ transmission of the physical downlink control channel, and the $N^{th}$ transmission of the physical downlink control channel is not a last transmission of the physical downlink control channel.

In an embodiment, the time domain position of the $N^{th}$ transmission of the physical downlink control channel is a time domain position of a first transmission of the physical downlink control channel.

In an embodiment, the time domain position of the $N^{th}$ transmission of the physical downlink control channel is a time domain position of a transmission other than a first transmission and the last transmission of the physical downlink control channel.

In an embodiment, the determining unit is further configured to: determine a fourth parameter configured to indicate the time domain position of the $N^{th}$ transmission of the physical downlink control channel.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information; and the time domain position of the $N^{th}$ transmission of the physical downlink control channel is determined based on the number of repeated transmissions of the physical downlink control channel and an index of the time domain position of the $N^{th}$ transmission of the physical downlink control channel.

In an embodiment, the downlink control information includes a first information field, and the first information field is configured to indicate the index of the time domain position of the $N^{th}$ transmission of the physical downlink control channel.

According to a fifth aspect of embodiments of the present disclosure, there is provided a downlink transmission device, which includes: a processor; and a memory for storing instructions executable by the processor. The processor is configured to execute the downlink transmission method as described in the first aspect or in any embodiment of the first aspect.

According to a sixth aspect of embodiments of the present disclosure, there is provided a downlink transmission device, includes: a processor; and a memory for storing instructions executable by the processor. The processor is configured to execute the downlink transmission method as described in the second aspect or in any embodiment of the second aspect.

According to a seventh aspect of embodiments of the present disclosure, there is provided a non-transitory computer-readable storage medium having stored therein instructions that, when executed by a processor of a mobile terminal, enable the mobile terminal to perform the downlink transmission method as described in the first aspect or in any embodiment of the first aspect.

According to an eighth aspect of embodiments of the present disclosure, there is provided a non-transitory computer-readable storage medium having stored therein instructions that, when executed by a processor of a network device, enable the network device to perform the downlink transmission method as described in the second aspect or in any embodiment of the second aspect.

The technical solutions provided by embodiments of the present disclosure may include the following beneficial effects: in embodiments of the present disclosure, the downlink transmission is performed based on the first parameter configured to indicate the number of repeated transmissions of the physical downlink control channel of the first type of terminal, which realizes the repeated transmissions of the physical downlink control channel, thereby achieving coverage enhancement and remedying the coverage loss caused by factors such as the reduction of the number of the antennas.

Figure 2:
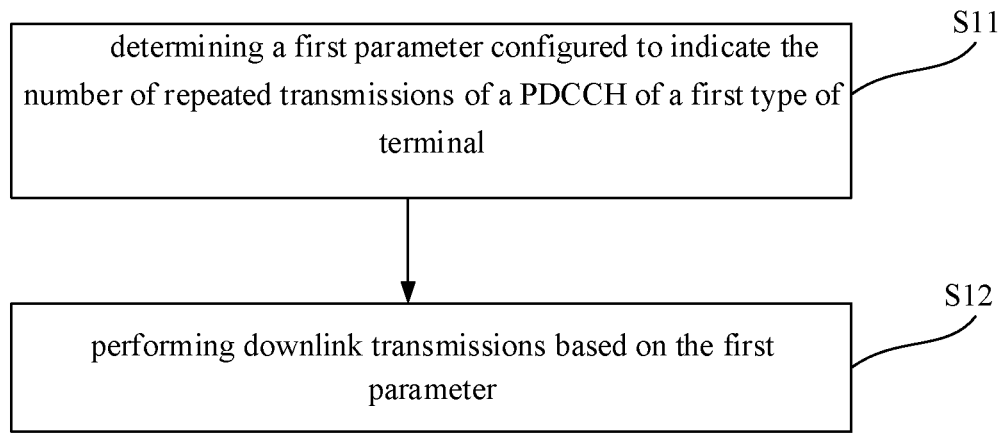
FIG. 2 is a flowchart showing a downlink transmission method according to an illustrative embodiment.

FIG. 2 is a flowchart showing a downlink transmission method according to an illustrative embodiment, as shown in FIG. 2, the downlink transmission method is applied to a terminal and includes the following steps.

In step S11, a first parameter is determined.

The first parameter is configured to indicate the number of repeated transmissions of a PDCCH of a first type of terminal.

In the related art, terminals for communication may include various types of terminals. In embodiments of the present disclosure, any two different types of terminals among various different types of terminals are referred to as a first type of terminal and a second type of terminal. The first type of terminal and the second type of terminal may have different capabilities. For example, the capability of the terminal may be a transceiving bandwidth, the number of transceiving antennas, the maximum bit number of a transmission block, and processing time delay, etc. Terminals having different capabilities may refer to terminals differing from each other in any one or more of the following capabilities: the transceiving bandwidth, the number of transceiving antennas, the maximum bit number of the transmission block, and the processing time delay. In an example, the first type of terminal may be an NR-lite terminal, and the second type of terminal may be an NR terminal.

In step S12, downlink transmission is performed based on the first parameter.

In embodiments of the present disclosure, the first parameter is configured to indicate the number of repeated transmissions of the PDCCH of the first type of terminal, so performing the downlink transmission based on the first parameter can realize multiple repeated transmissions of the PDCCH. The multiple repeated transmissions of the PDCCH can remedy the coverage loss of the first type of terminal caused by factors like the reduction of the number of receiving antennas and the reduction of the system bandwidth, thereby achieving coverage enhancement and optimizing communication transmission performance.

Further, in embodiments of the present disclosure, coverage enhancement can be achieved by performing multiple repeated transmissions of a physical downlink shared channel (PDSCH). That is, in embodiments of the present disclosure, the terminal may determine a second parameter. The second parameter is configured to indicate the number of repeated transmissions of a PDSCH of the first type of terminal. The terminal performs the repeated transmissions of the PDSCH based on the second parameter.

It can be understood that, the repeated transmissions of the PDSCH and the repeated transmissions of the PDCCH may be implemented independently, or may be implemented in combination. In an embodiment, joint repeated transmissions of the PDSCH and the PDCCH may be performed.

Figure 3:
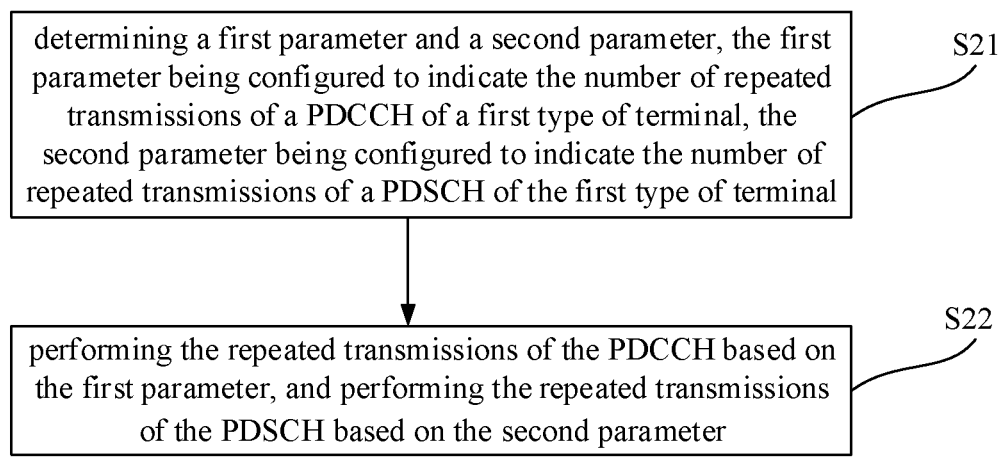
FIG. 3 is a flowchart showing a downlink transmission method according to an illustrative embodiment.

FIG. 3 is a flowchart of a downlink transmission method according to an embodiment, as shown in FIG. 3, the downlink transmission method is applied to a terminal and includes the following steps.

In step S21, a first parameter and a second parameter are determined.

The first parameter is configured to indicate the number of repeated transmissions of a PDCCH of a first type of terminal, and the second parameter is configured to indicate the number of repeated transmissions of a PDSCH of the first type of terminal.

In step S22, PDCCH transmission is performed based on the first parameter, and PDSCH transmission is performed based on the second parameter.

In embodiments of the present disclosure, the PDCCH transmission of a terminal refers to multiple repeated transmissions of the PDCCH, and the PDSCH transmission of the terminal refers to multiple repeated transmissions of the PDSCH. Repeated transmissions can remedy the coverage loss of the first type of terminal caused by factors like the reduction of the number of receiving antennas and the reduction of the system bandwidth in some scenarios, thereby achieving coverage enhancement and optimizing communication transmission performance.

In the related art, in the PDCCH and PDSCH transmission mechanism, a time domain resource association scheme for the PDSCH channel and the PDCCH channel is as follows: a time domain resource position of the PDSCH channel is indicated by downlink control information (DCI) carried by the PDCCH channel, and the time domain resource position of the PDSCH may be offset by 0 to 3 time slots relative to the transmission position of the PDCCH, that is, the PDSCH transmission and the PDCCH transmission may be performed in the same time slot, or the PDSCH transmission may be performed in 1 to 3 time slots subsequent to the time slot of the PDCCH transmission. For both the PDSCH transmission and the PDCCH transmission in the same time slot, the PDSCH transmission is performed after the PDCCH channel. FIG. 4 is a schematic diagram showing a pattern for joint transmission of the PDCCH and the PDSCH according to an illustrative embodiment. In FIG. 4, the PDSCH transmission is performed in 3 time slots subsequent to the PDCCH transmission.

In an embodiment, for the joint repeated transmissions of the PDCCH and the PDSCH, a time slot offset K0 of the PDSCH relative to the PDCCH is designed, for example, the time slot offset K0 may be 0 to 3 time slots. Based on the slot offset K0 of the PDSCH relative to the PDCCH, the repeated transmissions of the PDCCH and the repeated transmissions of the PDSCH are performed.

In all embodiments of the present disclosure, this offset may be used to determine absolute time slot offsets of the first time domain position and/or the second time domain position relative to a reference position. In all embodiments of the present disclosure, this offset may be used to determine a relative time slot offset between the first time domain position and the second time domain position.

In embodiments of the present disclosure, for the convenience of description, a parameter indicating the time slot offset K0 of the PDSCH relative to the PDCCH is referred to as a third parameter.

FIG. 5 is a flowchart showing a downlink transmission method according to an illustrative embodiment, as shown in FIG. 5, the downlink transmission method is applied to a terminal and includes the following steps.

In step S31, a first parameter, a second parameter and a third parameter are determined.

The first parameter is configured to indicate the number of repeated transmissions of a PDCCH of a first type of terminal, and the second parameter is configured to indicate the number of repeated transmissions of a PDSCH of the first type of terminal. The third parameter is configured to indicate a time slot offset of a first time domain position relative to a second time domain position. The first time domain position is a time domain position of the PDSCH, and the second time domain position is a time domain position of the PDCCH.

In step S32, joint repeated transmissions of the PDCCH and the PDSCH are performed based on the first parameter, the second parameter and the third parameter.

In embodiments of the present disclosure, the first time domain position may also be understood as a time domain position of a first transmission of the PDSCH, a time domain position at which the PDSCH starts the repeated transmissions.

In embodiments of the present disclosure, the time domain position of the PDCCH indicated by the second time domain position may be understood as a time domain position of the PDCCH which is apart from the time domain position of the first transmission of the PDSCH by the time slot offset K0.

In embodiments of the present disclosure, the second time domain position may be any time domain position during the repeated transmissions of the PDCCH. The second time domain position may be a fixed time domain position of the repeated transmissions of the PDCCH, such as a time domain position of a first transmission, a time domain position of a last transmission, or a time domain position of any transmission. The second time domain position may be a non-fixed time domain position of the repeated transmissions of the PDCCH, for example, a time domain position of any $N^{th}$ repeated transmission that is neither the time domain position of the first transmission nor the time domain position of the last transmission.

Embodiments of the present disclosure provide a pattern for the joint repeated transmissions of the PDCCH and the PDSCH, so as to realize the repeated transmissions of the PDCCH and the repeated transmissions of the PDSCH.

In an embodiment, the first time domain position is the time domain position of the first transmission of the PDSCH, and the second time domain position is the time domain position of the last transmission of the PDCCH. That is, the transmission of the PDSCH channel is started at a position corresponding to the time slot offset K0 after all the repeated transmissions of the PDCCH channel are completed, as shown in FIG. 6. FIG. 6 is a schematic diagram showing a pattern for the joint repeated transmissions of the PDCCH and the PDSCH according to an illustrative embodiment.

In an embodiment, the terminal determines the first parameter, the second parameter, and the third parameter, that is, the terminal determines the number Nc of repeated transmissions of the PDCCH channel, the number Ns of repeated transmissions of the PDSCH channel, and the time slot offset K0 of the time domain position of the first transmission of the PDSCH relative to the time domain position of the last transmission of the PDCCH.

The number Nc of repeated transmissions of the PDCCH channel and the number Ns of repeated transmissions of the PDSCH channel may be indicated by DCI. The time slot offset K0 may reuse a time domain resource indication field in the existing NR DCI, that is, K0 may take a value of 0 to 3. In different transmission, the content of information bits carried by the PDCCH are exactly the same.

In embodiments of the present disclosure, after determining the number Nc of repeated transmissions of the PDCCH channel, the number Ns of repeated transmissions of the PDSCH channel, and the time slot offset K0 of the time domain position of the first transmission of the PDSCH relative to the time domain position of the last transmission of the PDCCH, the terminal may perform the downlink transmission.

In an embodiment, the time domain position of the first transmission of the PDCCH is determined, and starting from the time domain position of the first transmission of the PDCCH, the PDCCH is received according to the number of repeated transmissions of the PDCCH, and at the first time domain position after the second time domain position, the PDSCH is received according to the number of repeated transmissions of the PDSCH.

In response to receiving the PDCCH at a current time domain position of the PDCCH, a non-awake state is entered and maintained until a next time domain position of the PDCCH, and an awake state is entered and the PDCCH is received at the next time domain position of the PDCCH.

In all embodiments of the present disclosure, the non-awake state may be a micro-sleep state or any other state other than the awake state.

In embodiments of the present disclosure, the terminal decodes a received PDCCH at a time domain position of an even-numbered transmission. In some embodiments, in response to successful decoding of the PDCCH, a sleep state is entered and maintained until the first time domain position, and an awake state is entered at the first time domain position and the PDSCH is received. In some embodiments, in response to unsuccessful decoding of the PDCCH, the PDCCH is cached.

The terminal decodes a received PDSCH at a position of each transmission of the PDSCH. In some embodiments, a sleep state is entered in response to successful decoding of the PDSCH. In some embodiments, the PDSCH is cached in response to unsuccessful decoding of the PDSCH.

In an example, the first type of terminal is a Redcap UE. The Redcap UE determines the time domain position of the first transmission of the PDCCH according to parameter information of a search space set and a control resource set configured by a radio resource control (RRC) signaling, and starts to receive the PDCCH at a corresponding time-frequency domain resource position. In each PDCCH transmission time slot, after receiving the PDCCH channel, the Redcap UE enters the non-awake state and will not wake up until the next PDCCH channel receiving time. The Redcap UE may attempt to decode the PDCCH channel at a position of an even-numbered transmission of the PDCCH channel. If the decoding of the PDCCH fails, the data is cached and reserved for HARQ combination with the PDCCH to be decoded next. If the PDCCH is successfully decoded, the Redcap UE enters a sleep state, and the remaining transmissions of the PDCCH are not processed, and the Redcap UE will not wake up until a start time of the transmission of the PDSCH channel.

Further, for each transmission of the PDSCH, the Redcap UE attempts to decode the PDSCH. In some embodiments, if the decoding of the PDSCH fails, the data is cached and reserved for HARQ combination with data of a next transmission of the PDSCH. In some embodiments, if the PDSCH is successfully decoded, a sleep state is entered, and the remaining transmissions of the PDSCH are not processed.

It can be understood that, in embodiments of the present disclosure, a time gap between different repeated transmissions of the PDCCH may be specified as a fixed value by a protocol, or may be statically configured by a network device through a higher-layer radio resource control (RRC) signaling. A time gap between different repeated transmissions of the PDSCH may be specified as a fixed value by a protocol, or may be statically configured by a network device through a higher-layer radio resource control (RRC) signaling.

In embodiments of the present disclosure, the manner of starting the transmission of the PDSCH channel at the position corresponding to the time slot offset K0 after all the repeated transmissions of the PDCCH channel are completed realizes serial reception of the PDCCH and the PDSCH. The serial reception of the PDCCH and the PDSCH can effectively reduce the energy consumption of the Redcap UE, and at the same time, can effectively reduce the processing complexity of the device. Considering the possible introduction of higher transmission delay, this scheme may be applied to a use case that is not sensitive to delay requirements, such as video surveillance device.

In an embodiment, the first time domain position is the time domain position of the first transmission of the PDSCH, and the second time domain position is a time domain position of an $N^{th}$ transmission of the PDCCH. The $N^{th}$ transmission is not the last transmission. That is, the transmission of the PDSCH channel is started at a position corresponding to the time slot offset K0 after a certain time domain position of the repeated transmissions of the PDCCH channel, and it can also be understood as that the time domain position of the first transmission of the PDSCH is located in the process of the repeated transmissions of the PDCCH.

Figure 7:
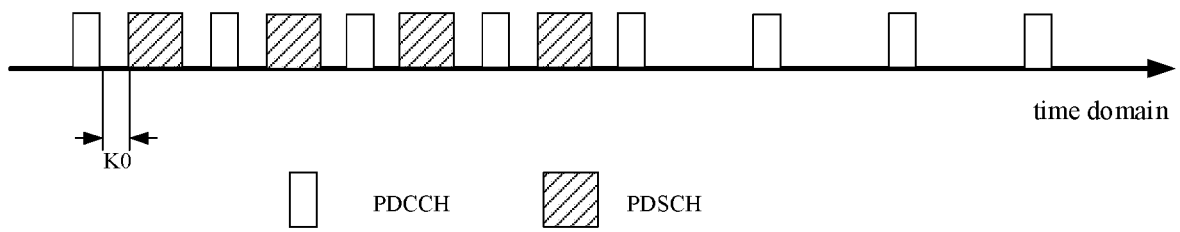
FIG. 7 is a schematic diagram showing a pattern for joint repeated transmissions of PDCCH and PDSCH according to an illustrative embodiment.

In an example, the time domain position of the $N^{th}$ transmission of the PDCCH is the time domain position of the first transmission of the PDCCH. That is, at a position corresponding to the time slot offset K0 after the first transmission of the PDCCH channel, the transmission of the PDSCH channel is started, as shown in FIG. 7. FIG. 7 is a schematic diagram showing a pattern for joint repeated transmissions of the PDCCH and the PDSCH according to an illustrative embodiment.

In embodiments of the present disclosure, the manner in which the terminal determines the first parameter, the second parameter, and the third parameter may be as described in the foregoing embodiments. That is, the terminal determines the number Nc of repeated transmissions of the PDCCH channel, the number Ns of repeated transmissions of the PDSCH channel, and the time slot offset K0 of the time domain position of the first transmission of the PDSCH relative to the time domain position of the first transmission of the PDCCH. The number Nc of repeated transmissions of the PDCCH channel and the number Ns of repeated transmissions of the PDSCH channel may be indicated by DCI. The time slot offset K0 may reuse a time domain resource indication field in the existing NR DCI, that is, K0 may take a value of 0 to 3. In different transmission, the content of information bits carried by the PDCCH are exactly the same.

In embodiments of the present disclosure, after determining the number Nc of repeated transmissions of the PDCCH channel, the number Ns of repeated transmissions of the PDSCH channel, and the time slot offset K0 of the time domain position of the first transmission of the PDSCH relative to the time domain position of the last transmission of the PDCCH, the terminal may perform the downlink transmission.

In an embodiment, the time domain position of the first transmission of the PDCCH is determined, and starting from the time domain position of the first transmission of the PDCCH, the PDCCH is received and cached according to the number of repeated transmissions of the PDCCH, and starting from the time domain position of the first transmission of the PDCCH, the PDSCH is received and cached according to the number of repeated transmissions of the PDSCH. The first type of terminal decodes a received PDCCH at a time domain position of an even-numbered transmission. In some embodiments, in response to successful decoding of the PDCCH, a time domain position of a transmission of the PDSCH is determined, and the PDSCH is decoded. In some embodiments, in response to unsuccessful decoding of the PDCCH, the PDCCH and PDSCH are received and cached at a next time domain position of the PDCCH.

Further, in some embodiments, in response to successful decoding of the PDCCH, if there is a PDSCH cached at the time domain position of the transmission of the PDSCH determined, the PDSCH cached is decoded. In some embodiments, in response to the successful decoding of the PDCCH, if there is no PDSCH cached at the time domain position of the transmission of the PDSCH determined, a sleep state is entered and maintained until a next time domain position of the PDSCH, an awake state is entered at the next time domain position of the PDSCH, and the PDSCH is received and decoded. In some embodiments, in response to successful decoding of the PDSCH, a sleep state is entered until time domain transmissions of the PDSCH and the PDCCH end. In some embodiments, in response to unsuccessful decoding of the PDSCH, the PDSCH is received and cached at a next time domain position of the PDSCH, and reception of the PDCCH is stopped.

In embodiments of the present disclosure, illustrations are made with the Redcap UE as an example of the first type of terminal. The time slot offset K0 still reuses the time domain resource indication field in the existing NR DCI. Therefore, in embodiments of the present disclosure, a transmission of the PDSCH may start in 0th to 3rd time slot beginning from a transmission of the PDCCH.

The Redcap UE receives and caches both the PDCCH and the PDSCH in a time slot in which a transmission of the PDCCH starts. In a time slot of each even-numbered transmission, the Redcap UE attempts to decode the PDCCH channel. If the decoding of the PDCCH fails, the reception of the PDCCH and the PDSCH is continued. If the PDCCH is successfully decoded, a time domain position of the PDSCH channel is searched according to a time domain indication field in the PDCCH. If there is PDSCH data cached at a current moment, that is, the transmission of the PDSCH has started, the Redcap UE attempts to decode the PDSCH channel. If the decoding of the PDSCH channel fails, the reception of the PDSCH channel is continued, and the reception of the PDCCH channel is not continued. If the PDSCH channel is successfully decoded, the Redcap UE enters a sleep state and does not wake up until the end of the transmissions of the PDSCH and the PDCCH. If the transmission of the PDSCH has not started at the current moment, the Redcap UE enters a sleep state, and wakes up to receive and decode the PDSCH channel when the transmission of the PDSCH starts, until the decoding succeeds.

It can be understood that, in embodiments of the present disclosure, a time gap between different repeated transmissions of the PDCCH may be specified as a fixed value by a protocol, or may be statically configured by a network device through a higher-layer radio resource control (RRC) signaling. A time gap between different repeated transmissions of the PDSCH may be specified as a fixed value by a protocol, or may be statically configured by a network device through a higher-layer radio resource control (RRC) signaling.

In embodiments of the present disclosure, the repeated transmissions of the PDSCH start at the position corresponding to the time slot offset K0 after the time domain position of the first transmission of the PDCCH, so that the Redcap UE may need to receive and process both the PDCCH channel and the PDSCH channel in the same time slot, which requires higher complexity of the device relative to the embodiments where the repeated transmissions of the PDSCH start at the position corresponding to the time slot offset K0 after the time domain position of the last transmission of the PDCCH. However, compared with the embodiments where the repeated transmissions of the PDSCH start at the position corresponding to the time slot offset K0 after the time domain position of the last transmission of the PDCCH, the embodiments where the repeated transmissions of the PDSCH start at the position corresponding to the time slot offset K0 after the time domain position of the first transmission of the PDCCH has lower delay overhead. In addition, in a scenario where a current channel quality is good, if the Redcap UE successfully decodes the PDSCH before the end of the repeated transmissions of the PDCCH, the energy consumption of the device can be effectively reduced. The embodiments where the repeated transmissions of the PDSCH start at the position corresponding to the time slot offset K0 after the time domain position of the first transmission of the PDCCH is applicable to a use case with high delay requirements, such as safety related sensors and other scenarios.

Figure 8:
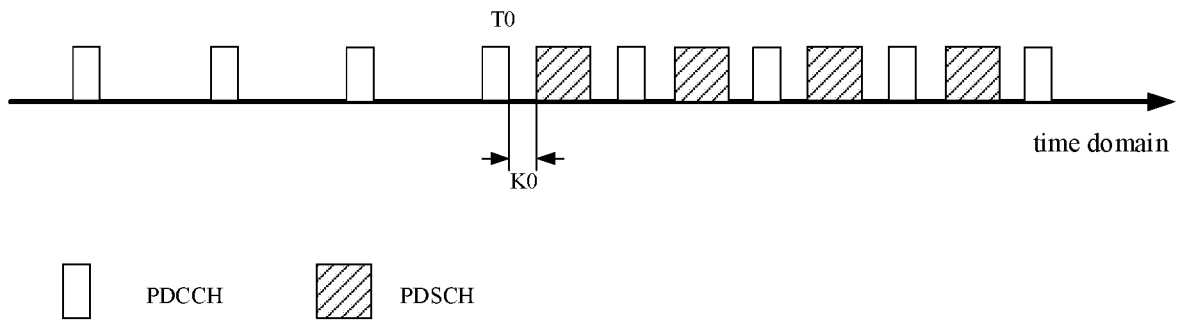
FIG. 8 is a schematic diagram showing a pattern for joint repeated transmissions of PDCCH and PDSCH according to an illustrative embodiment.

In another embodiment, the time domain position of the $N^{th}$ transmission of the PDCCH is neither the time domain position of the first transmission of the PDCCH nor the time domain position of the last transmission of the PDCCH. That is, the transmission of the PDSCH channel starts at a position corresponding to the time slot offset K0 after a certain time domain position (the time domain resource position is represented by T0) of the transmission process other than the first transmission and last transmission of the PDCCH channel, as shown in FIG. 8. FIG. 8 is a schematic diagram showing a pattern for joint repeated transmissions of the PDCCH and the PDSCH according to an illustrative embodiment.

In embodiments of the present disclosure, in a scenario where the time domain position of the $N^{th}$ transmission of the PDCCH is neither the time domain position of the first transmission of the PDCCH nor the time domain position of the last transmission of the PDCCH, besides the number Nc of repeated transmissions of the PDCCH channel, the number Ns of repeated transmissions of the PDSCH channel, and the time slot offset K0 of the time domain position of the first transmission of the PDSCH relative to the time domain position of the $N^{th}$ transmission of the PDCCH, the time domain position T0 of the $N^{th}$ transmission of the PDCCH also needs to be determined. That is, in embodiments of the present disclosure, the terminal also needs to determine a fourth parameter, and the fourth parameter is configured to indicate the time domain position T0 of the $N^{th}$ transmission of the PDCCH.

In an embodiment, in order to further reduce signaling overhead, the fourth parameter and the third parameter may be fixed values determined based on a protocol, and/or indicated based on DCI.

In an embodiment, in a case where the third parameter is a fixed value determined based on the protocol, and the fourth parameter is indicated based on downlink control information, the time domain position T0 of the $N^{th}$ transmission of the PDCCH is determined based on the number of transmissions of the PDCCH and an index of the time domain position T0 of the $N^{th}$ transmission of the PDCCH. In an example, the time domain position T0 of the $N^{th}$ transmission of the PDCCH is: Nc/4*(index value of T0+1).

In embodiments of the present disclosure, the time domain position T0 of the $N^{th}$ transmission of the PDCCH may be indicated by a first information domain included in the DCI. That is, the first information field is configured to indicate the index of the time domain position T0 of the $N^{th}$ transmission of the PDCCH. In embodiments of the present disclosure, in order to reduce signaling overhead, when the time slot offset K0 of the time domain position of the first transmission of the PDSCH relative to the time domain position of the $N^{th}$ transmission of the PDCCH is a fixed value determined based on a protocol, the first information field configured to indicate the index of the time domain position T0 of the $N^{th}$ transmission of the PDCCH may reuse the information field in the DCI which is originally configured to indicate the time slot offset K0.

In embodiments of the present disclosure, the time domain position T0 of the $N^{th}$ transmission of the PDCCH may be one-quarter Nc, two-quarter Nc, three-quarter Nc or Nc. For example, when the PDCCH is retransmitted 8 times, alternative T0 positions include: the second PDCCH transmission, the fourth PDCCH transmission, the sixth PDCCH, and the eighth PDCCH transmission.

In embodiments of the present disclosure, illustrations are made still with the Redcap UE as an example of the first type of terminal. When the Redcap UE performs the repeated transmissions of the PDCCH and the PDSCH, it determines the number Nc of repeated transmissions of the PDCCH channel, the number Ns of repeated transmissions of the PDSCH channel, the time slot offset K0 of the time domain position of the first transmission of the PDSCH relative to the time domain position of the $N^{th}$ transmission of the PDCCH, and the time domain position T0 of the $N^{th}$ transmission of the PDCCH. In order to further reduce the signaling overhead, the time domain position T0 of the $N^{th}$ transmission of the PDCCH and the time slot offset K0 may be specified by a protocol as fixed values, or may be indicated by DCI. In a case where the time slot offset K0 is specified by the protocol as a fixed value, time slot offset bits (2 bits) in the time domain resource indication field of the DCI may be reused to carry the index value of the time domain position T0 of the $N^{th}$ transmission of the PDCCH, to further reduce the signaling overhead. The index of the time domain position T0 of the $N^{th}$ transmission of the PDCCH has four values: 0 to 3, and an actual position of the time domain position T0 of the $N^{th}$ transmission of the PDCCH is Nc/4*(index value of T0+1). In order to increase the scheduling flexibility, the time domain position T0 of the $N^{th}$ transmission of the PDCCH and the time slot offset K0 are not specified as fixed values by the protocol at the same time.

In the scenario where the time domain position of the $N^{th}$ transmission of the PDCCH is neither the time domain position of the first transmission of the PDCCH nor the time domain position of the last transmission of the PDCCH, the value of the time domain position T0 of the $N^{th}$ transmission of the PDCCH may be indicated by the network device, and the manner of relatively fixing the reference time domain position (for embodiments where the repeated transmissions of the PDSCH start at the position corresponding to the time slot offset K0 after the time domain position of the first transmission of the PDCCH, or embodiments where the repeated transmissions of the PDSCH start at the position corresponding to the time slot offset K0 after the time domain position of the last transmission of the PDCCH) increases the scheduling flexibility of network device. In addition, compared with embodiments where the repeated transmissions of the PDSCH start at the position corresponding to the time slot offset K0 after the time domain position of the last transmission of the PDCCH, the transmission delay can be effectively reduced.

In embodiments of the present disclosure, after determining the number Nc of repeated transmissions of the PDCCH channel, the number Ns of repeated transmissions of the PDSCH channel, and the time slot offset K0 of the time domain position of the first transmission of the PDSCH relative to the time domain position of the $N^{th}$ transmission of the PDCCH, and the time domain position T0 of the $N^{th}$ transmission of the PDCCH, the terminal may perform the downlink transmission.

In an embodiment, the time domain position of the first transmission of the PDCCH is determined, and starting from the time domain position of the first transmission of the PDCCH, the PDCCH is received and cached according to the number of repeated transmissions of the PDCCH, and starting from the time domain position of the $N^{th}$ transmission of the PDCCH, the PDSCH is received and cached according to the number of repeated transmissions of the PDSCH. The first type of terminal decodes the received PDCCH at a time domain position of an even-numbered transmission. In response to the successful decoding of the PDCCH, a time domain position of a transmission of the PDSCH is determined, and the PDSCH is decoded. In response to unsuccessful decoding of the PDCCH, the PDCCH and PDSCH are received and cached at a next time domain position of the PDCCH.

Further, in response to successful decoding of the PDCCH, if there is a PDSCH cached at the time domain position of the transmission of the PDSCH determined, the PDSCH cached is decoded. In response to the successful decoding of the PDCCH, if there is no PDSCH cached at the time domain position of the transmission of the PDSCH determined, a sleep state is entered and maintained until a next time domain position of the PDSCH, an awake state is entered at the next time domain position of the PDSCH, and the PDSCH is received and decoded. In response to successful decoding of the PDSCH, a sleep state is entered until time domain transmissions of the PDSCH and the PDCCH end. In response to unsuccessful decoding of the PDSCH, the PDSCH is received and cached at a next time domain position of the PDSCH, and reception of the PDCCH is stopped.

It can be understood that, in embodiments of the present disclosure, a time gap between different repeated transmissions of the PDCCH may be specified as a fixed value by a protocol, or may be statically configured by a network device through a higher-layer radio resource control (RRC) signaling. A time gap between different repeated transmissions of the PDSCH may be specified as a fixed value by a protocol, or may be statically configured by a network device through a higher-layer radio resource control (RRC) signaling.

The downlink transmission method for the repeated transmissions of the PDCCH and/or the repeated transmissions of the PDSCH provided by embodiments of the present disclosure can be applied to a network device.

Figure 9:
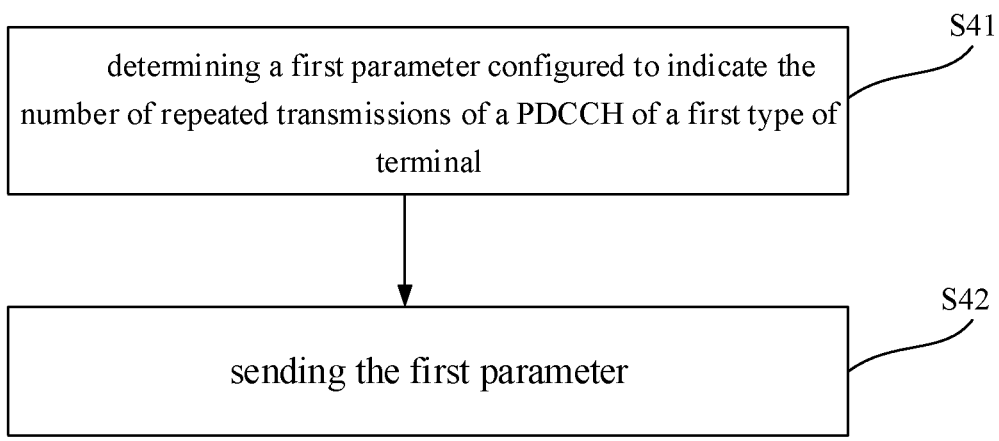
FIG. 9 is a flowchart showing a downlink transmission method according to an illustrative embodiment of the present disclosure.

FIG. 9 is a flowchart showing a downlink transmission method according to an illustrative embodiment of the present disclosure. As shown in FIG. 9, the downlink transmission method is applied to a network device, and the downlink transmission method includes the following steps.

In step S41, a first parameter is determined. The first parameter is configured to indicate the number of repeated transmissions of a PDCCH of a first type of terminal.

In step S42, the first parameter is sent.

Figure 10:
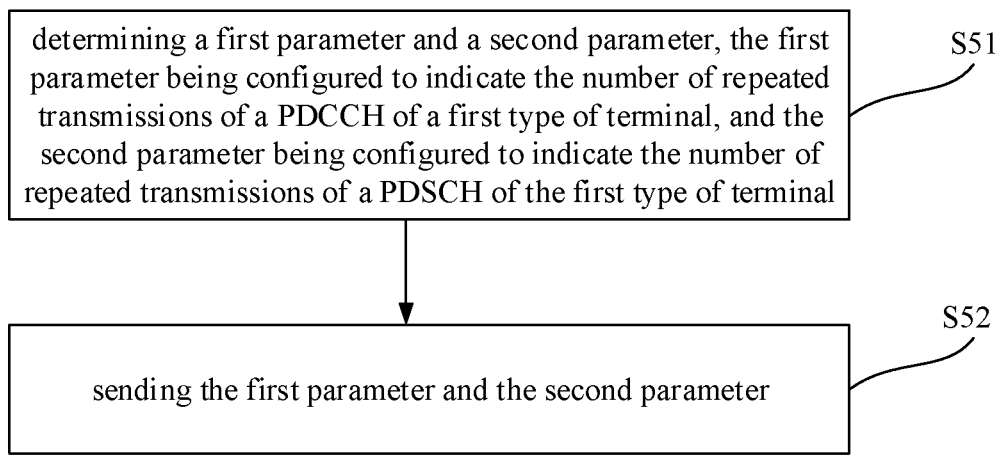
FIG. 10 is a flowchart showing a downlink transmission method according to an illustrative embodiment of the present disclosure.

FIG. 10 is a flowchart showing a downlink transmission method according to an illustrative embodiment of the present disclosure. As shown in FIG. 10, the downlink transmission method is applied to a network device, and the downlink transmission method includes the following steps.

In an embodiment, the downlink transmission method further includes steps S51 and S52.

In step S51, a first parameter and a second parameter are determined.

The first parameter is configured to indicate the number of repeated transmissions of a PDCCH of a first type of terminal. The second parameter is configured to indicate the number of repeated transmissions of a PDSCH of the first type of terminal.

In step S52, the first parameter and the second parameter are sent.

Further, in embodiments of the present disclosure, the network device may also determine a third parameter. The third parameter is configured to indicate a time slot offset of a first time domain position relative to a second time domain position, the first time domain position is a time domain position of a transmission of the PDSCH, and the second time domain position is a time domain position of a transmission of the PDCCH.

In an embodiment, the first time domain position is a time domain position of a first transmission of the PDSCH, and the second time domain position is a time domain position of a last transmission of the PDCCH.

In an embodiment, the first time domain position is a time domain position of a first transmission of the PDSCH, and the second time domain position is a time domain position of an $N^{th}$ transmission of the PDCCH, and the $N^{th}$ transmission is not the last transmission.

In an embodiment, the time domain position of the $N^{th}$ transmission of the PDCCH is a time domain position of a first transmission of the PDCCH.

In an embodiment, the time domain position of the $N^{th}$ transmission of the PDCCH is neither a time domain position of a first transmission of the PDCCH nor a time domain position of a last transmission of the PDCCH.

Further, in embodiments of the present disclosure, the network device may further determine a fourth parameter, and the fourth parameter is configured to indicate a time domain position of the $N^{th}$ transmission of the PDCCH.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information; and the time domain position of the $N^{th}$ transmission of the PDCCH is determined based on the number of repeated transmissions of the PDCCH and an index of the time domain position of the $N^{th}$ transmission of the PDCCH.

In an embodiment, the downlink control information includes a first information field, and the first information field is configured to indicate the index of the time domain position of the $N^{th}$ transmission of the PDCCH.

It can be understood that the first type of terminal involved in the above embodiments of the present disclosure may be a NR-lite terminal.

It can be further understood that, in embodiments of the present disclosure, for the process of implementing the downlink transmission method by the network device, reference may be made to the process of implementing the downlink transmission implementation by the terminal as described above, which will not be elaborated here.

It can be further understood that the downlink transmission method provided by embodiments of the present disclosure can also be applied to a process in which a network device interacts with a terminal to achieve the communication based on a threshold value of a communication parameter. For the specific implementation process, reference may be made to the implementation process of communication processing achieved at the terminal side or the network side involved in the above embodiments, which will not be elaborated here.

It should be noted that those skilled in the art can understand that various implementations/embodiments involved in the above embodiments of the present disclosure may be used in combination with precedent embodiments or may be used independently. No matter used alone or in combination with precedent embodiments, the implementation principles are similar. In embodiments of the present disclosure, some embodiments are described in a combination manner. Certainly, those skilled in the art can understand that such examples are not intended to limit embodiments of the present disclosure.

Based on the same concept, embodiments of the present disclosure also provides a downlink transmission apparatus.

It can be understood that, in order to realize the above-mentioned functions, the downlink transmission apparatus in embodiments of the present disclosure includes the corresponding hardware structure and/or software module for executing each function. In combination with the units and algorithm steps of the examples disclosed in embodiments of the present disclosure, embodiments of the present disclosure may be implemented in hardware or a combination of hardware and computer software. Whether a function is implemented in hardware or computer software driving hardware depends on the specific application and design constraints of the technical solution. Those skilled in the art may use different methods to achieve the described functions for each specific application, but such implementation should not be considered beyond the scope of the technical solutions of the embodiments of the present disclosure.

Figure 11:
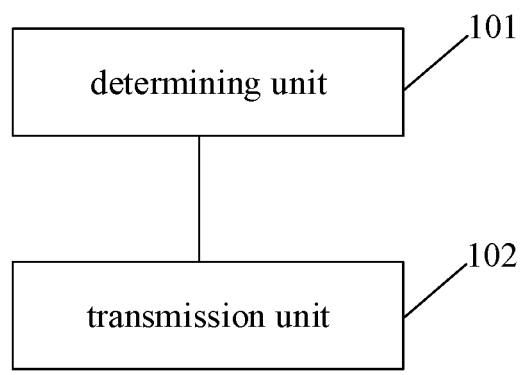
FIG. 11 is a block diagram showing a downlink transmission apparatus according to an illustrative embodiment.

FIG. 11 is a block diagram showing a downlink transmission apparatus according to an illustrative embodiment. Referring to FIG. 11, the downlink transmission apparatus 100 is applied to a terminal and includes: a determining unit 101 and a transmission unit 102.

The determining unit 101 is configured to determine a first parameter, and the first parameter is configured to indicate the number of repeated transmissions of a PDCCH of a first type of terminal. The transmission unit 102 is configured to perform downlink transmissions based on the first parameter.

In an embodiment, the determining unit 101 is further configured to determine a second parameter, and the second parameter is configured to indicate the number of repeated transmissions of a PDSCH of the first type of terminal.

In an embodiment, the determining unit 101 is further configured to determine a third parameter, and the third parameter is configured to indicate a time slot offset of a first time domain position relative to a second time domain position. The first time domain position is a time domain position of a transmission of the PDSCH, and the second time domain position is a time domain position of a transmission of the PDCCH.

In an embodiment, the first time domain position is a time domain position of a first transmission of the PDSCH, and the second time domain position is a time domain position of a last transmission of the PDCCH.

In an embodiment, the transmission unit 102 is configured to perform the downlink transmissions based on the first parameter by: determining a time domain position of a first transmission of the PDCCH, receiving the PDCCH according to the number of repeated transmissions of the PDCCH, starting from the time domain position of the first transmission of the PDCCH, and receiving the PDSCH according to the number of repeated transmissions of the PDSCH at the first time domain position after the second time domain position.

In an embodiment, the transmission unit 102 is configured to receive the PDCCH according to the number of repeated transmissions of the PDCCH by: entering a non-awake state in response to receiving the PDCCH at a current time domain position of the PDCCH, and maintaining the non-awake state until a next time domain position of the PDCCH, and entering an awake state at the next time domain position of the PDCCH and receiving the PDCCH.

In an embodiment, the transmission unit 102 is configured to perform the downlink transmissions based on the first parameter by: decoding a received PDCCH at a time domain position of an even-numbered transmission; and entering a sleep state in response to successful decoding of the PDCCH and maintaining the sleep state until the first time domain position, entering an awake state at the first time domain position and receiving the PDSCH; or caching the PDCCH in response to unsuccessful decoding of the PDCCH.

In an embodiment, the transmission unit 102 is configured to receive the PDSCH by: decoding a received PDSCH at a position of each transmission of the PDSCH; and entering a sleep state in response to successful decoding of the PDSCH; or caching the PDSCH in response to unsuccessful decoding of the PDSCH.

In an embodiment, the first time domain position is a time domain position of a first transmission of the PDSCH, the second time domain position is a time domain position of an $N^{th}$ transmission of the PDCCH, and the $N^{th}$ transmission of the PDCCH is not a last transmission of the PDCCH.

In an embodiment, the transmission unit 102 is configured to perform the downlink transmissions based on the first parameter by: determining a time domain position of a first transmission of the PDCCH; receiving and caching the PDCCH according to the number of repeated transmissions of the PDCCH, starting from the time domain position of the first transmission of the PDCCH; and receiving and caching the PDSCH according to the number of repeated transmissions of the PDSCH, starting from the time domain position of the $N^{th}$ transmission of the PDCCH.

In an embodiment, the transmission unit 102 is configured to receive the PDCCH according to the number of repeated transmissions of the PDCCH and receive the PDSCH according to the number of repeated transmissions of the PDSCH by: decoding a received PDCCH at a time domain position of an even-numbered transmission; and determining a time domain position of a transmission of the PDSCH and decoding the PDSCH, in response to successful decoding of the PDCCH; or receiving and caching the PDCCH and the PDSCH at a next time domain position of the PDCCH, in response to unsuccessful decoding of the PDCCH.

In an embodiment, the transmission unit 102 is configured to decode the PDSCH by: in response to determining that there is a PDSCH cached at the time domain position of the transmission of the PDSCH determined, decoding the PDSCH cached; or in response to determining that there is no PDSCH cached at the time domain position of the transmission of the PDSCH determined, entering a sleep state and maintaining the sleep state until a next time domain position of the PDSCH, entering an awake state at the next time domain position of the PDSCH, and receiving and decoding the PDSCH.

In an embodiment, the transmission unit 102 is configured to decode the PDSCH cached by: entering a sleep state until time domain transmissions of the PDSCH and the PDCCH end, in response to successful decoding of the PDSCH; or receiving and caching the PDSCH at a next time domain position of the PDSCH, and stopping receiving the PDCCH, in response to unsuccessful decoding of the PDSCH.

In an embodiment, the time domain position of the $N^{th}$ transmission of the PDCCH is a time domain position of a first transmission of the PDCCH.

In an embodiment, the time domain position of the $N^{th}$ transmission of the PDCCH is a time domain position of a transmission other than a first transmission and the last transmission of the PDCCH.

In an embodiment, the determining unit 101 is further configured to determine a fourth parameter, and the fourth parameter is configured to indicate the time domain position of the $N^{th}$ transmission of the PDCCH.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information. The time domain position of the $N^{th}$ transmission of the PDCCH is determined based on the number of repeated transmissions of the PDCCH and an index of the time domain position of the $N^{th}$ transmission of the PDCCH.

In an embodiment, the downlink control information includes a first information field, and the first information field is configured to indicate the index of the time domain position of the $N^{th}$ transmission of the PDCCH.

Figure 12:
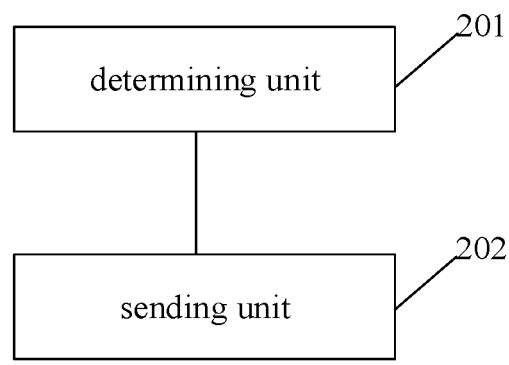
FIG. 12 is a block diagram showing a downlink transmission apparatus according to an illustrative embodiment.

FIG. 12 is a block diagram showing a downlink transmission apparatus according to an illustrative embodiment. Referring to FIG. 12, the downlink transmission apparatus 200 is applied to a network device, and includes a determining unit 201 and a sending unit 202.

The determining unit 201 is configured to determine a first parameter, and the first parameter is configured to indicate the number of repeated transmissions of a physical downlink control channel of a first type of terminal. The sending unit 202 is configured to send the first parameter.

In an embodiment, the determining unit 201 is further configured to determine a second parameter, and the second parameter is configured to indicate the number of repeated transmissions of a PDSCH of the first type of terminal. The sending unit 202 is further configured to send the second parameter.

In an embodiment, the determining unit 201 is further configured to determine a third parameter, the third parameter is configured to indicate a time slot offset of a first time domain position relative to a second time domain position, the first time domain position is a time domain position of a transmission of the PDSCH, and the second time domain position is a time domain position of a transmission of the PDCCH.

In an embodiment, the first time domain position is a time domain position of a first transmission of the PDSCH, and the second time domain position is a time domain position of a last transmission of the PDCCH.

In an embodiment, the first time domain position is a time domain position of a first transmission of the PDSCH, the second time domain position is a time domain position of an $N^{th}$ transmission of the PDCCH, and the $N^{th}$ transmission of the PDCCH is not a last transmission of the PDCCH.

In an embodiment, the time domain position of the $N^{th}$ transmission of the PDCCH is a time domain position of a first transmission of the PDCCH.

In an embodiment, the time domain position of the $N^{th}$ transmission of the PDCCH is a time domain position of a transmission other than a first transmission and the last transmission of the PDCCH.

In an embodiment, the determining unit 201 is further configured to: determine a fourth parameter, and the fourth parameter is configured to indicate the time domain position of the $N^{th}$ transmission of the PDCCH.

In an embodiment, the fourth parameter and the third parameter are fixed values determined based on a protocol, and/or are indicated based on downlink control information.

In an embodiment, the third parameter is a fixed value determined based on a protocol, and the fourth parameter is indicated based on downlink control information. The time domain position of the $N^{th}$ transmission of the PDCCH is determined based on the number of repeated transmissions of the PDCCH and an index of the time domain position of the $N^{th}$ transmission of the PDCCH.

In an embodiment, the downlink control information includes a first information field, and the first information field is configured to indicate the index of the time domain position of the $N^{th}$ transmission of the PDCCH.

With respect to the apparatus in the above embodiments, the specific manners for performing operations for individual modules therein have been described in detail in the embodiments regarding the methods, which will not be elaborated herein.

Figure 13:
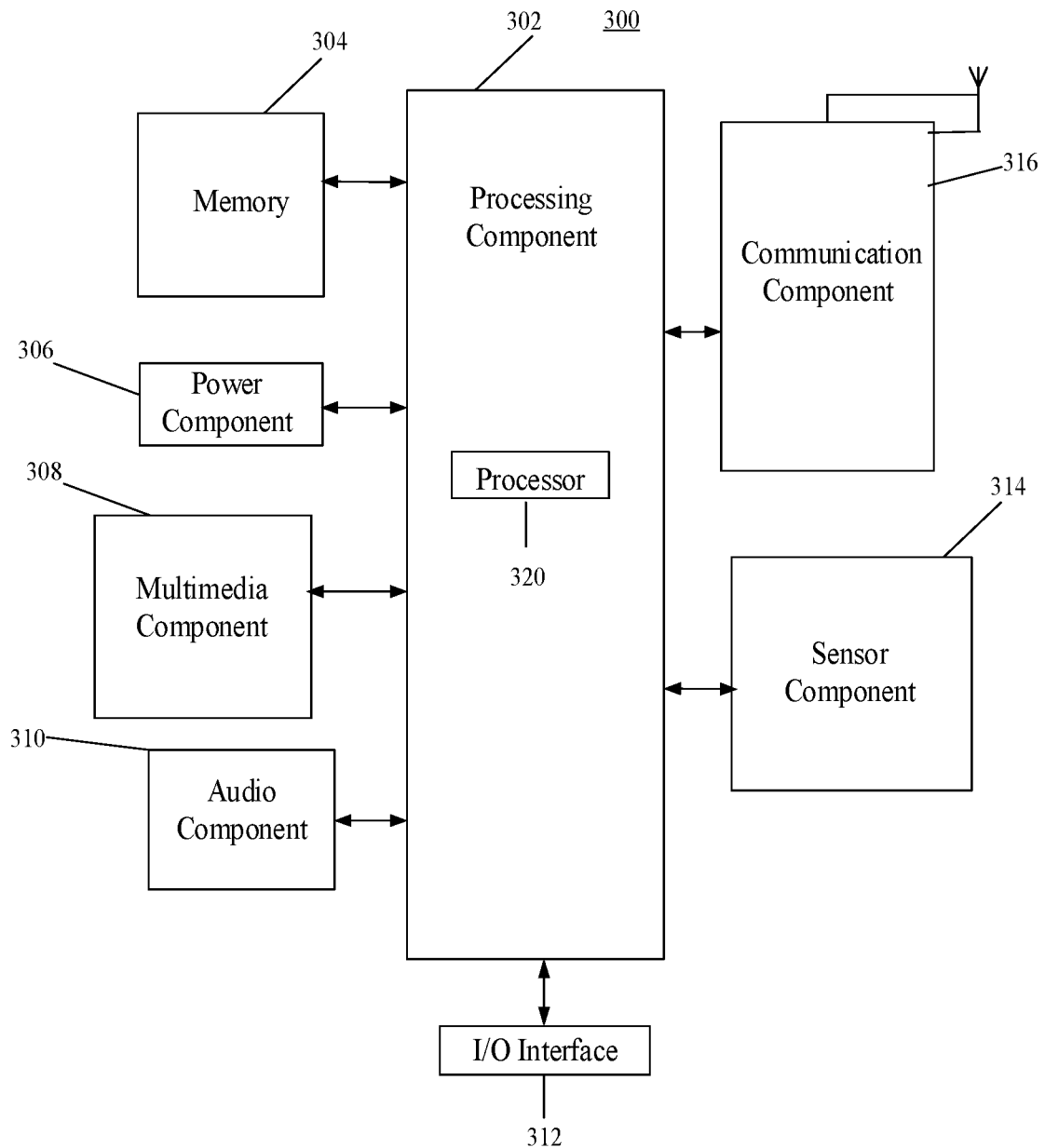
FIG. 13 is a block diagram showing a device for downlink transmission according to an illustrative embodiment.

FIG. 13 is a block diagram showing a device for downlink transmission according to an illustrative embodiment. For example, the device 300 can be a mobile phone, a computer, a digital broadcast terminal, a messaging device, a game console, a tablet device, a medical device, a fitness device, a personal digital assistant, or the like.

Referring to FIG. 13, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, phone calls, data communications, camera operations, and recording operations. The processing component 302 can include one or more processors 320 to execute instructions to perform all or some of the steps in the above-described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and/or the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as keyboards, click wheels, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may further include a light sensor, such as a CMOS or CCD image sensor, for use in imaging applications. In some embodiments, the sensor component 314 may further include an accelerometer sensor, a gyroscope sensor, a magnetic sensor, a pressure sensor, or a temperature sensor.

The communication component 316 is configured to facilitate communication, wired or wireless, between the device 300 and other devices. The device 300 can access a wireless network based on a communication standard, such as Wi-Fi, 2G, or 3G, or a combination thereof. In an illustrative embodiment, the communication component 316 receives a broadcast signal or broadcast associated information from an external broadcast management system via a broadcast channel. In an illustrative embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing steps of the downlink transmission method in the above-mentioned embodiments.

In an illustrative embodiment, there is also provided a non-transitory computer readable storage medium including instructions, such as included in the memory 304, executable by the processor 320 in the device 300, for completing the above-mentioned downlink transmission method. For example, the non-transitory computer-readable storage medium may be a ROM, a random access memory (RAM), a CD-ROM, a magnetic tape, a floppy disc, an optical data storage device, and the like.

Figure 14:
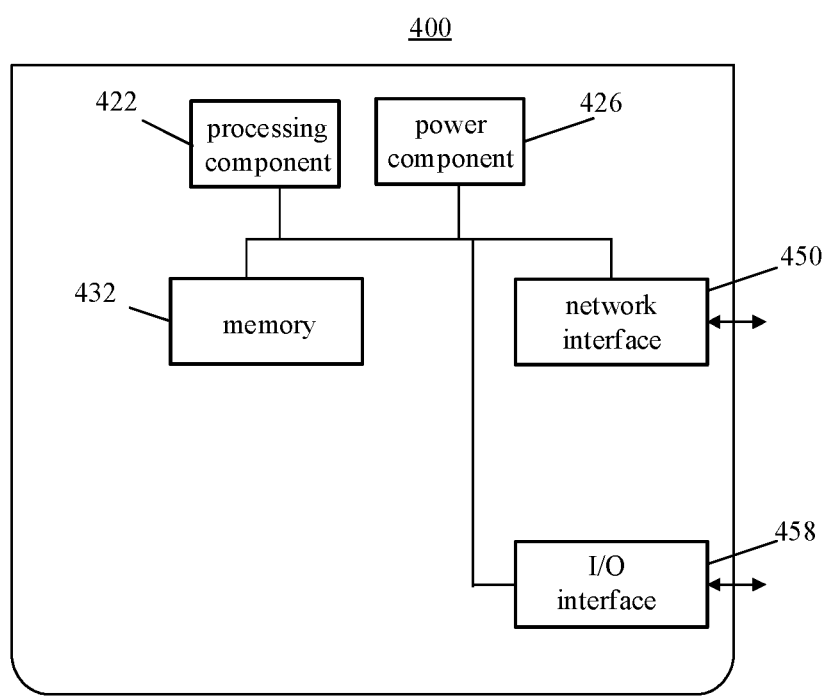
FIG. 14 is a block diagram showing a device for downlink transmission according to an illustrative embodiment.

FIG. 14 is a block diagram showing a device for downlink transmission according to an illustrative embodiment. For example, the device 400 may be provided as a server. Referring to FIG. 14, the device 400 includes a processing component 422, which further includes one or more processors, and a memory resource represented by a memory 432 for storing instructions executable by the processing component 422, such as an application program. The application program stored in the memory 432 may include one or more modules, each corresponding to a set of instructions. Additionally, the processing component 422 is configured to execute instructions to perform the above-described methods.

The device 400 may also include a power component 426 configured to perform power management of device 400, a wired or wireless network interface 450 configured to connect the device 400 to a network, and an input output (I/O) interface 458. The device 400 may operate an operating system stored in the memory 432, such as Windows Server™, Mac OS X™, Unix™, Linux™, FreeBSD™, or the like.

In an illustrative embodiment, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 432, executable by the processing component 422 in the device 400, for completing the above-mentioned method. For example, the non-transitory computer-readable storage medium may be a ROM, a random access memory (RAM), a CD-ROM, a magnetic tape, a floppy disc, an optical data storage device, and the like.

It should be further understood that in the present disclosure, the term "a plurality of" refers to two or more, and other quantifiers are similar thereto. The term "and/or" describes an association relationship of associated objects, and indicates that there are three kinds of relationships. For example, A and/or B can indicate three kinds of relationships, i.e., A alone, B alone, and coexist of A and B. The character "/" generally indicates an "or" relationship of the associated objects. The singular forms "a," "the," and "said" are intended to include plural forms as well, unless clearly indicated in the context otherwise.

It should be further understood that, terms such as "first," and "second" are used for describing various information, but these information should not be limited by these terms. These terms are only used for distinguishing information of the same type from each other, but does not indicate a particular order or a degree of importance. In fact, expressions such as "first," and "second" are completely interchangeable. For example, first information may also be referred to as second information, and similarly, the second information may also be referred to as the first information, without departing from the scope of the present disclosure.

It is further to be understood that, although operations in embodiments of the present disclosure are described in a specific order in the drawings, it should not be construed as requiring the operations to be performed in the specific order as shown or a serial order, or requiring all the operations as shown to be performed to obtain the desired result. In certain circumstances, multitasking and parallel processing may be advantageous.

Embodiments of the present disclosure also provide a downlink transmission method, which is applied to a network device and includes: determining a transmission parameter, and performing downlink transmissions based on the transmission parameter. The transmission parameter includes a first parameter configured to indicate a transmission parameter of a physical downlink control channel of a first type of terminal and/or a second parameter configured to indicate a transmission parameter of a physical downlink shared channel of the first type of terminal.

Embodiments of the present disclosure also provide a downlink transmission method, which is applied to a network device and includes: determining a transmission parameter. The transmission parameter is configured to indicate a relative time slot offset between a first time domain position and a second time domain position, the first time domain position is a time domain position of a transmission of the physical downlink shared channel, and the second time domain position is a time domain position of a transmission of the physical downlink control channel.

Embodiments of the present disclosure also provide a downlink transmission method, which is applied to a network device and includes: determining a transmission parameter. The transmission parameter is configured to indicate absolute time slot offsets of a first time domain position and/or a second time domain position relative to a reference position, the first time domain position is a time domain position of a transmission of the physical downlink shared channel, and the second time domain position is a time domain position of a transmission of the physical downlink control channel.

Embodiments of the present disclosure also provide a downlink transmission method, which is applied to a network device and includes: determining a time domain position of a transmission of the physical downlink control channel; receiving the physical downlink control channel according to the number of repeated transmissions of the physical downlink control channel, starting from the time domain position of the transmission of the physical downlink control channel, and receiving the physical downlink shared channel according to the number of repeated transmissions of the physical downlink shared channel at the first time domain position after the second time domain position.

In any of the above embodiments, the network device is any of the following devices: a base station, a core network device, a user terminal, or the like.

In any of the above embodiments, the first parameter is configured to indicate the number of repeated transmissions of the physical downlink control channel of the first type of terminal.

In any of the above embodiments, the second parameter is configured to indicate the number of repeated transmissions of the physical downlink shared channel of the first type of terminal.

In any of the above embodiments, the first time domain position is a time domain position of a first transmission of the physical downlink shared channel, and the second time domain position is a time domain position of a last transmission of the physical downlink control channel.

In any of the above embodiments, receiving the physical downlink control channel according to the number of repeated transmissions of the physical downlink control channel includes: entering a non-awake state in response to receiving the physical downlink control channel at a time domain position of the physical downlink control channel PDCCH, and maintaining the non-awake state until a next time domain position of the physical downlink control channel PDCCH, and entering an awake state at the next time domain position of the physical downlink control channel PDCCH and receiving the physical downlink control channel PDCCH.

In any of the above embodiments, the non-awake state may be a micro-sleep state.

In any of the above embodiments, performing downlink transmissions based on the first parameter further includes: decoding a received physical downlink control channel at a time domain position of an even-numbered transmission; and performing a response operation according to a decoding of the physical downlink control channel. The performing the response operation according to the decoding of the physical downlink control channel includes: entering a sleep state in response to successful decoding of the physical downlink control channel and maintaining the sleep state until the first time domain position, entering an awake state at the first time domain position and receiving the physical downlink shared channel; or caching the physical downlink control channel in response to unsuccessful decoding of the physical downlink control channel.

In any of the above embodiments, receiving the physical downlink shared channel includes: decoding a received physical downlink shared channel at a position of each transmission of the physical downlink shared channel; and performing a response operation according to a decoding of the physical downlink control channel. The performing the response operation according to the decoding of the physical downlink control channel includes: entering a sleep state in response to successful decoding of the physical downlink shared channel; or caching the physical downlink shared channel in response to unsuccessful decoding of the physical downlink shared channel.

In any of the above embodiments, the first time domain position is a time domain position of a first transmission of the physical downlink shared channel, the second time domain position is a time domain position of an $N^{th}$ transmission of the physical downlink control channel, and the $N^{th}$ transmission is not a last transmission.

The performing downlink transmissions based on the first parameter includes: determining a time domain position of a transmission of the physical downlink control channel; receiving and caching the physical downlink control channel according to the number of repeated transmissions of the physical downlink control channel, starting from the time domain position of the transmission of the physical downlink control channel; and receiving and caching the physical downlink shared channel according to the number of repeated transmissions of the physical downlink shared channel, starting from the time domain position of the $N^{th}$ transmission of the physical downlink control channel.

In any of the above embodiments, the time domain position of the transmission of the physical downlink control channel is a time domain position of a first transmission of the physical downlink control channel.

In any of the above embodiments, receiving the physical downlink control channel according to the number of repeated transmissions of the physical downlink control channel and receiving the physical downlink shared channel according to the number of repeated transmissions of the physical downlink shared channel includes: decoding a received physical downlink control channel at a time domain position of an even-numbered transmission; determining a time domain position of a transmission of the physical downlink shared channel and decoding the physical downlink shared channel, in response to successful decoding of the physical downlink control channel; and receiving and caching the physical downlink control channel and the physical downlink shared channel at a next time domain position of the physical downlink control channel, in response to unsuccessful decoding of the physical downlink control channel.

In any of the above embodiments, decoding the physical downlink shared channel includes: in response to determining that there is a physical downlink shared channel cached at the time domain position of the transmission of the physical downlink shared channel determined, decoding the physical downlink shared channel cached.

In any of the above embodiments, decoding the physical downlink shared channel includes: in response to determining that there is no physical downlink shared channel cached at the time domain position of the transmission of the physical downlink shared channel determined, entering a sleep state and maintaining the sleep state until a next time domain position of the physical downlink shared channel, entering an awake state at the next time domain position of the physical downlink shared channel, and receiving and decoding the physical downlink shared channel.

In any of the above embodiments, decoding the physical downlink shared channel cached includes: entering a sleep state until time domain transmissions of the physical downlink shared channel and the physical downlink control channel end, in response to successful decoding of the physical downlink shared channel.

In any of the above embodiments, decoding the physical downlink shared channel cached includes: receiving and caching the physical downlink shared channel at a next time domain position of the physical downlink shared channel, and stopping receiving the physical downlink control channel, in response to unsuccessful decoding of the physical downlink shared channel.

In any of the above embodiments, the time domain position of the $N^{th}$ transmission of the physical downlink control channel is a time domain position of a first transmission of the physical downlink control channel.

In any of the above embodiments, the time domain position of the $N^{th}$ transmission of the physical downlink control channel is a time domain position of a transmission other than a first transmission and the last transmission of the physical downlink control channel.

In any of the above embodiments, the downlink transmission method further includes: determining a fourth parameter configured to indicate the time domain position of the $N^{th}$ transmission of the physical downlink control channel.

In any of the above embodiments, the fourth parameter and the third parameter are fixed values determined based on a protocol.

In any of the above embodiments, the fourth parameter and the third parameter are determined based on downlink control information.

In any of the above embodiments, the third parameter is a fixed value determined based on a protocol, and the fourth parameter is determined based on downlink control information; and the time domain position of the $N^{th}$ transmission of the physical downlink control channel is determined based on the number of repeated transmissions of the physical downlink control channel and an index of the time domain position of the $N^{th}$ transmission of the physical downlink control channel.

In any of the above embodiments, the downlink control information includes a first information field, and the first information field is configured to indicate the index of the time domain position of the $N^{th}$ transmission of the physical downlink control channel.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and embodiments be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A downlink transmission device, comprising:
    a processor; and
    a memory for storing instructions executable by the processor;
    wherein the processor is configured to:
    perform downlink repeated reception of a physical downlink control channel (PDCCH) and a physical downlink shared channel (PDSCH) based on a time slot offset;
    wherein the time slot offset is a time slot offset of a first time domain position relative to a second time domain position, the first time domain position is after the second time domain position, the first time domain position is a time domain position of a first transmission of the PDSCH, the second time domain position is a time domain position of an $N^{th}$ transmission or a last transmission of the PDCCH, and the $N^{th}$ transmission is any transmission of the PDCCH other than a first transmission or the last transmission of the PDCCH.

2. A downlink transmission method, performed by a terminal, comprising:
    performing downlink repeated reception of a physical downlink control channel (PDCCH) and a physical downlink shared channel (PDSCH) based on a time slot offset;
    wherein the time slot offset is a time slot offset of a first time domain position relative to a second time domain position, the first time domain position is after the second time domain position, the first time domain position is a time domain position of a first transmission of the PDSCH, the second time domain position is a time domain position of an $N^{th}$ transmission or a last transmission of the PDCCH, and the $N^{th}$ transmission is any transmission of the PDCCH other than a first transmission or the last transmission of the PDCCH.

3. A non-transitory computer-readable storage medium having stored therein instructions that, when executed by a processor of a mobile terminal, enable the mobile terminal to perform the downlink transmission method according to claim 2.

4. The downlink transmission method according to claim 2, wherein performing the downlink repeated reception of the PDCCH and the PDSCH based on the time slot offset comprises:

determining a time domain position of the first transmission of the PDCCH, and performing the downlink repeated reception of the PDCCH starting from the time domain position of the first transmission of the PDCCH;

determining the first time domain position based on the second time domain position and the time slot offset, after the repeated reception of the PDCCH is ended; and performing the downlink repeated reception of the PDSCH starting from the first time domain position.

5. The downlink transmission method according to claim 2, wherein the first time domain position is at a position corresponding to the time slot offset after the second time domain position.

6. The downlink transmission method according to claim 2, wherein time slot offset comprises 0 to 3 time slots.

7. The downlink transmission method according to claim 2, wherein performing the downlink repeated reception of the PDCCH and the PDSCH based on the time slot offset comprises:

performing the downlink repeated reception of the PDCCH and the PDSCH based on a first parameter, a second parameter, and the time slot offset;

wherein the first parameter indicates the number of repeated transmissions of the PDCCH, and the second parameter indicates the number of repeated transmissions of the PDSCH.

8. The downlink transmission method according to claim 2, wherein a time gap between different repeated transmissions of the PDCCH is specified by a protocol or is statically configured by a radio resource control (RRC) signaling sent by a network device.

9. A downlink transmission method, performed by a network device, comprising:

performing downlink repeated sending of a physical downlink control channel (PDCCH) and a physical downlink shared channel (PDSCH) based on a time slot offset;

wherein the time slot offset is a time slot offset of a first time domain position relative to a second time domain position, the first time domain position is after the second time domain position, the first time domain position is a time domain position of a first transmission of the PDSCH, the second time domain position is a time domain position of an $N^{th}$ transmission or a last transmission of the PDCCH, and the $N^{th}$ transmission is any transmission of the PDCCH other than a first transmission or the last transmission of the PDCCH.

10. A downlink transmission device, comprising:
a processor; and
a memory for storing instructions executable by the processor;
wherein the processor is configured to execute the downlink transmission method according to claim 9.

11. A non-transitory computer-readable storage medium having stored therein instructions that, when executed by a processor of a network device, enable the network device to perform the downlink transmission method according to claim 9.

12. The downlink transmission method according to claim 9, wherein performing the downlink repeated sending of the PDCCH and the PDSCH based on the time slot offset comprises:

determining a time domain position of the first transmission of the PDCCH, and performing the downlink repeated sending of the PDCCH starting from the time domain position of the first transmission of the PDCCH;

determining the first time domain position based on the second time domain position and the time slot offset, after the repeated sending of the PDCCH is ended; and performing the downlink repeated sending of the PDSCH starting from the first time domain position.

13. The downlink transmission method according to claim 9, wherein the first time domain position is at a position corresponding to the time slot offset after the second time domain position.

14. The downlink transmission method according to claim 9, wherein time slot offset comprises 0 to 3 time slots.

15. The downlink transmission method according to claim 9, wherein performing the downlink repeated sending of the PDCCH and the PDSCH based on the time slot offset comprises:

performing the downlink repeated sending of the PDCCH and the PDSCH based on a first parameter, a second parameter, and the time slot offset;

wherein the first parameter indicates the number of repeated transmissions of the PDCCH, and the second parameter indicates the number of repeated transmissions of the PDSCH.

16. The downlink transmission method according to claim 9, wherein a time gap between different repeated transmissions of the PDCCH is specified by a protocol or is statically configured by a radio resource control (RRC) signaling sent by the network device.

* * * * *